United States Patent
Bhat et al.

(10) Patent No.: US 8,629,647 B2
(45) Date of Patent: Jan. 14, 2014

(54) BATTERY CHARGER APPARATUS AND METHOD FOR A PHOTOVOLTAIC SYSTEM

(75) Inventors: Dattatreya Bhat, Karnataka (IN); Mukesh Nair, Bangalore (IN); Nagavolu Srinivasa Murty, Bangalore (IN); Vasu Poojary, Bangalore (IN)

(73) Assignee: NXP, B.V., Eindhoven (NL)

( * ) Notice: Subject to any disclaimer, the term of this patent is extended or adjusted under 35 U.S.C. 154(b) by 485 days.

(21) Appl. No.: 12/846,714

(22) Filed: Jul. 29, 2010

(65) Prior Publication Data

US 2011/0031926 A1 Feb. 10, 2011

(30) Foreign Application Priority Data

Jul. 31, 2009 (EP) ..................................... 09166959

(51) Int. Cl.
*H01M 10/44* (2006.01)
(52) U.S. Cl.
USPC .......................................... 320/101; 323/906
(58) Field of Classification Search
USPC ......................................... 320/101; 323/906
See application file for complete search history.

(56) References Cited

U.S. PATENT DOCUMENTS

| | | | |
|---|---|---|---|
| 3,489,915 A | 1/1970 | Engelhardt | |
| 5,869,949 A * | 2/1999 | Nishikawa et al. ........... | 320/101 |
| 7,701,083 B2 * | 4/2010 | Savage ............................ | 307/29 |
| 2004/0207366 A1 | 10/2004 | Sung | |
| 2008/0224652 A1 * | 9/2008 | Zhu et al. ....................... | 320/101 |
| 2009/0079385 A1 * | 3/2009 | Xiao et al. ..................... | 320/102 |
| 2009/0284240 A1 * | 11/2009 | Zhang et al. .................. | 323/285 |
| 2010/0295381 A1 * | 11/2010 | Burger et al. .................. | 307/126 |
| 2011/0210694 A1 * | 9/2011 | Uehashi et al. ............... | 320/101 |
| 2011/0285375 A1 * | 11/2011 | Deboy ............................ | 323/299 |
| 2013/0057196 A1 * | 3/2013 | Ku et al. ........................ | 320/101 |
| 2013/0175883 A1 * | 7/2013 | Deboy ........................... | 307/151 |

FOREIGN PATENT DOCUMENTS

| | | |
|---|---|---|
| DE | 10 2008 004675 B3 | 3/2009 |
| DE | 102008004675 B3 * | 3/2009 |
| WO | 2006/137948 A2 | 12/2006 |
| WO | 2009049717 A1 | 4/2009 |

OTHER PUBLICATIONS

European Search Report for a Patent Appln. No. EP09166959.8 (Mar. 2010).

* cited by examiner

*Primary Examiner* — Samuel Berhanu
*Assistant Examiner* — Manuel Hernandez (57) ABSTRACT

A battery charger, or charge controller, for a photovoltaic system is disclosed, comprising a maximum power point tracker (MPPT) circuit, which may be bypassed by means of a bypass circuit. The bypass circuit may be a simple electrical wire or link. The battery charger is operable to track the maximum power of a photogenerator by means of the MPPT, or to bypass the MPPT and disable it, in dependence on whether the power loss which results from the MPPT would be greater than the power saving achieved by tracking the maximum power point of the photogenerator.
Also disclosed is a control unit for use in such a battery charger, and a method for controlling such a battery charger.

20 Claims, 5 Drawing Sheets

BATTERY CHARGER APPARATUS AND METHOD FOR A PHOTOVOLTAIC SYSTEM

FIELD OF INVENTION

This invention relates to battery chargers for photovoltaic systems, to methods of operating such battery chargers, and to controllers configured to operate such a method.

BACKGROUND OF INVENTION

A basic photovoltaic system comprises a photovoltaic generator such as a solar panel, which may be connected to a load. Since the power output from a photovoltaic generator varies with operating conditions, for instance the time of day, it is normal to include a battery in the system such that the load can be powered asynchronously with the photovoltaic power generation.

In order, inter alia, to derive the maximum power from the photovoltaic generator across a range of operating conditions, including the variation in insolation due to for instance cloud cover or the solar inclination, conventional photovoltaic systems include a charge controller or battery charger, in line between the photovoltaic generator and the battery.

Typical high efficiency battery chargers are able detect and track the operating voltage of the photovoltaic generator at which it can produce maximum power. This operating voltage is termed the Max Power Point voltage (Vmp), and at this voltage the panel is at its maximum power point (MPP) producing maximum power (Pmax).

However, battery chargers themselves typically are not 100% efficient, and consume some power, in order to operate. The power consumed by the battery charger is thus not available to charge the battery (since it is a self powered system).

In order to improve the photovoltaic system overall, it is desirable to reduce such power consumption.

SUMMARY OF INVENTION

It is an object of the present invention to provide a battery charger for the photovoltaic system which provides a relatively high power to the battery to be charged.

According to the present invention there is provided a battery charger for a photovoltaic system, comprising an input circuit having an input for connection to the photovoltaic system, an output circuit having an output for connection to a battery, a tracker circuit and a tracker bypass circuit each connectable between the input circuit and the output circuit, sensing means for sensing at least one of a PV voltage at the input, a PV current at the input, a charging voltage at the output and a charging current at the output and a controller configured to connect a one of the bypass circuit or the tracker circuit in dependence on at least one of the PV voltage and the PV current and the charging voltage and the charging current. The output circuit may also be connected to a load. The terms 'PV voltage' and 'PV current' refer to Photovoltaic voltage and current respectively, and thus correspond to the respective current and voltage produced by the photovoltaic generator which forms part of the photovoltaic system.

In embodiments the tracker circuit comprises a DC-DC converter configured to track, in use, a maximum power point of the photovoltaic system. In embodiments the controller is operable to connect the bypass circuit on the condition that the charging current is less than a predetermined multiple of the PV current at the maximum power point. The predetermined multiple may preferably be between 100% and 105%, and most preferably may be 103%. This allows for particularly convenient control, without requiring unnecessary switching between modes.

In embodiments at least one of the input circuit and the output circuit comprises a protection circuit for protection against at least one of overload and short-circuit and overcharging.

According to another aspect of the present invention there is provided a controller configured for use in a battery charger as just described, the controller being further configured to control the tracker circuit.

According to a yet further aspect of the invention there is provided a method of controlling a photovoltaic battery charger having a tracker mode in which an input current is converted to an output current, and a tracker bypass mode, the method comprising: determining a value of a parameter indicative of an output power when the charger is in tracker mode, determining a second value of a second parameter indicative of an output power when the charger is in bypass mode, and selecting a one of the tracker mode and the bypass mode in dependence on the first value and the second value.

In embodiments there is provided a method of operating a controller for a photovoltaic battery charger having a tracker mode in which an input current is converted to an output current, and a tracker bypass mode, the method comprising: selecting the tracker mode, sensing at least one of an input parameter and an output parameter, and selecting a one of the tracker mode and the tracker bypass mode in dependence on at least one of the input parameter and the output parameter.

In embodiments the input parameter is an input current and the output parameter is an output current.

In embodiments the bypass mode is selected if the output current is less than a predetermined multiple of the input current. The predetermined multiple is preferably between 100% and 105%, and most preferably is 103%.

In embodiments when the charger is in tracker mode, the controller adjusts the input current such that an input power is within a predetermined range of a maximum power point. Preferably the controller adjusts the input current such that the input power is within 2% of a maximum power point; thus a readily achievable controller is possible, which provides for a relatively low loss due to mismatch between the operating point and the maximum power point.

In embodiments selecting a one of the tracker mode and the tracker bypass mode comprises connecting the respective one between an input of the photovoltaic battery charger and an output of the photovoltaic battery charger.

According to a yet further aspect of the present invention there is provided a computer program, which when run on a computer, causes the computer to operate the method as just described. The term 'computer' is to be construed broadly herein, and includes, without limitation, personal computers, microprocessors, digital signal processors, and the like. The program may be held on a carrier and may be software.

These and other aspects of the invention will be apparent from, and elucidated with reference to, the embodiments described hereinafter.

BRIEF DESCRIPTION OF DRAWINGS

Embodiments of the invention will be described, by way of example only, with reference to the drawings, in which FIG. 1 schematically illustrates a photovoltaic system including a battery charger without maximum power point tracking;

FIG. 4 shows graphs of battery current against voltage for non-MPPT and MPPT chargers with various efficiencies for a photo-generator with, at (a), a higher maximum-power voltage, and at (b) a lower maximum-power voltage;

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar feature in modified and different embodiments.

DETAILED DESCRIPTION OF EMBODIMENTS

Figure 1:
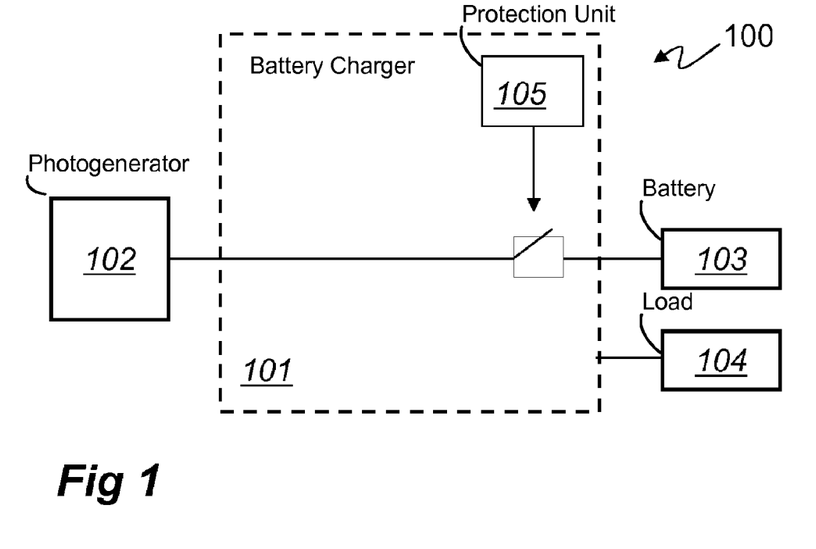
Figure 3:
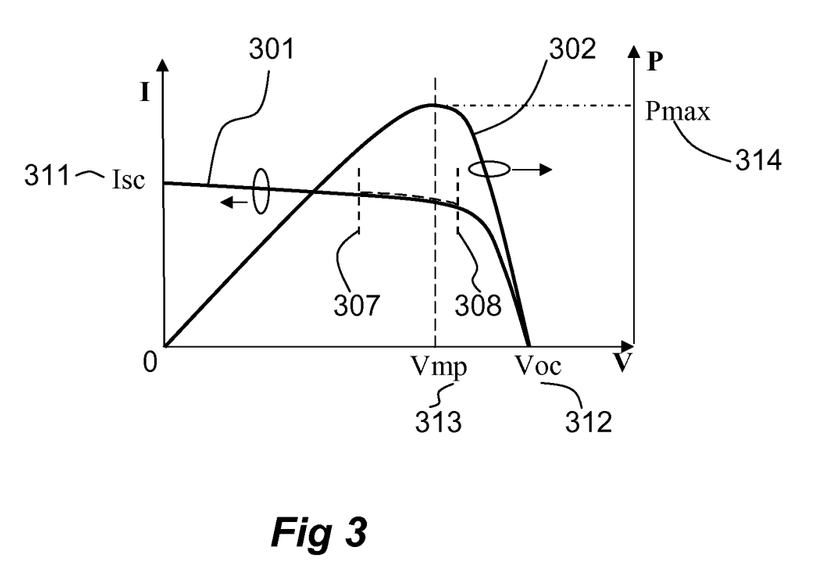
FIG. 3 shows current-voltage and power-voltage operating curves of a photovoltaic generator.

FIG. 1 shows, schematically, a photovoltaic system 100, comprising a battery charger 101 having its input connected to a photogenerator 102 and its output connected to a battery 103. The photo generator 102 may typically be one or more solar panels, or solar modules, which may be connected in series to achieve the required voltage, or in series-parallel in order to provide additional current at the required voltage. The battery charger, which may also be referred to as a charge controller, is also connectable to a load 104. The charger may include protection unit 105, which is able to disconnect the battery 103 from the photogenerator 102 by means of on-off control. Such a protection unit may provide overload protection; alternatively and without limitation, it may be for battery short circuit protection, battery reverse connection protection, battery low voltage cut-off, lightning protection, EMI/ESD protection or the like. Such a battery charger disadvantageously provides no independent control over the operating point of the photogenerator, that is to say the position along the current-voltage operating characteristic of the photogenerator which will be discussed below with reference to FIG. 3, compared with the battery voltage.

Figure 2:
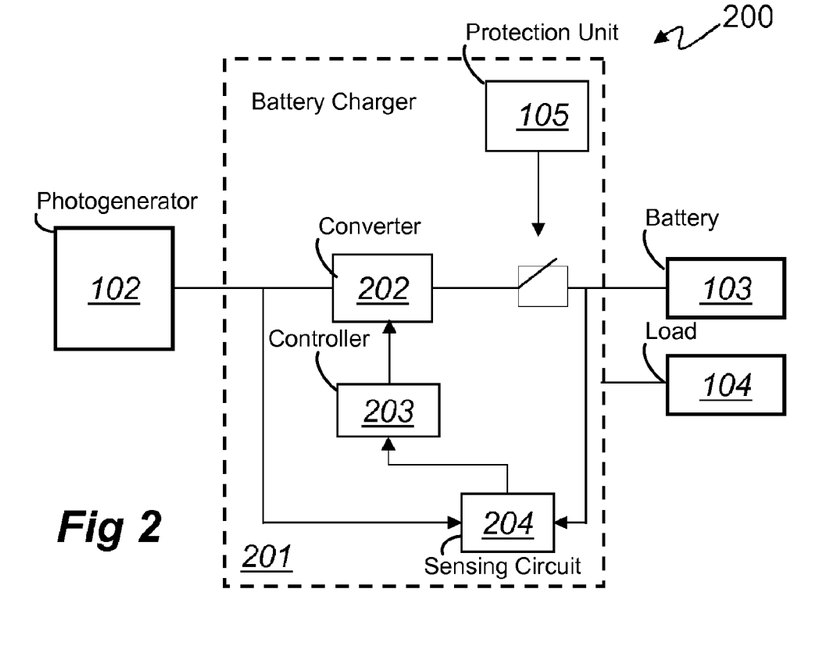
FIG. 2 schematically illustrates a photovoltaic system including a maximum power point tracking (MPPT) battery charger.

In order to decouple the battery voltage, that is to say the voltage at which charge is supplied into the battery, from the operating point of the photogenerator, it is known to use a battery charger, which includes maximum power points tracking (MPPT). An MPPT battery charger is shown schematically in FIG. 2. FIG. 2 shows a photovoltaic system 200 in which a battery charger 201 is connected, similarly to that of FIG. 1, to a photogenerator 102 and a battery 103, and optionally to a load 104. Battery charger 201 again may include protection unit 105, but this time it includes a DC-DC converter 202 between the input and output. The DC-DC converter is operated in a known manner by means of a controller at 203, in order to decouple the operating voltage of the photogenerator 102 from the battery voltage 103. Sensing circuit 204 determines either or both of the current and voltage at the input and, or in the alternative or, at the output of the battery charger, in order to provide for effective control of the DC-DC converter.

Maximum power point tracking (MPPT) will be familiar to the skilled person, but will be briefly now discussed with reference to FIG. 3. FIG. 3 shows a typical current-voltage characteristic 301 and power-voltage characteristic 302 for typical photogenerator, such as a solar panel or solar module. Both when the panel is short-circuited with a current Isc at 311, and when it is open circuited with a voltage Voc 312, the power output by the panel is zero. Therebetween, with increasing voltage, the current is nearly flat along a plateau before falling relatively sharply towards Voc 312. The power 302 increases with increasing voltage up to a 'maximum power' voltage Vmp 313 at which the power is a maximum at the Pmax point 314. This point is also referred to hereafter as the maximum power point (MPP). It should be noted, that for typical solar modules, the short circuit current scales approximately linearly with the irradiance level or insolation, whilst due to the diode in each solar cell, the open circuit voltage only increases logarithmically with increasing insolation. Under invariant operating conditions such as insolation and temperature the panel must operate somewhere along its PV characteristic as shown, there is only one voltage at which the panel produces the maximum available power. Maximum power point tracking circuits take advantage of this fact by looking for a local maximum in the panel's output power as the voltage is varied. By varying the input impedance of the MPPT circuit so that the panel operates at this voltage, the MPPT circuit can ensure that the panel is providing its maximum possible power output. If the operating conditions vary, due to for instance increased cloud cover or reduced insolation due to approaching twilight, Vmp may vary and the MPPT circuit can track the variation to ensure once more that the panel provides its maximum possible output.

Due to the decoupling of the input impedance from the output impedance of the MPPT, the solar panel continues to supply a charge at Vmp 313, irrespective of the state of charge of the battery. This is in contrast to a non-tracking battery charger such as described in FIG. 1; in a non-tracking battery charger, the battery voltage may vary between a voltage 307 corresponding to a nearly discharged battery and which may less than Vmp 313, to a voltage 308 corresponding to a nearly fully charged battery and which may greater than Vmp. Of course depending on the battery voltage characteristics, and the relative sizing of the photogenerator, the Vmp may be to the left of, in between, or to the right of upper and lower charge bounds 307 and 308.

As a concrete example, consider a 70 W PV panel with Vmp of 17V and thus Imp of 4.12 A and Isc of 4.72 A, used to charge a battery at voltage of 14 V, by means of a non-MPPT battery charger. Since the battery voltage is slightly lower than the maximum power voltage, the panel operates slightly to the left of the maximum power points, and produces a current which is approximately 4.24 A. Were the battery voltage to be slightly lower, for instance 12V, the panel would operate slightly further to the left on the IV characteristic, and thus produce a slightly higher current.

Consider now a similar panel being used to charge a similar battery by means of a MPPT battery charger. Since the battery charger operates to maintain the maximum power operating point of the panel, the battery current may be determined by means of the following equation $$\text{Battery Current} = (PV\text{ power}) \times (\text{Efficiency})/\text{Battery Voltage} \qquad (1),$$

where 'Efficiency' is the conversion efficiency of the MPPT controller. Then, for the 70 W PV panel again with Vmp of 17V and Imp of 4.12 A, a charge controller of efficiency 90%, and battery at 14V, the battery current will be Battery Current=(70*0.9)/14=4.5 A.

Further, if the battery is at 12V, the charging current will be (70*0.9)/12=5.25 A. Thus for MPPT based charging system, the battery current is higher.

Figure 4A:
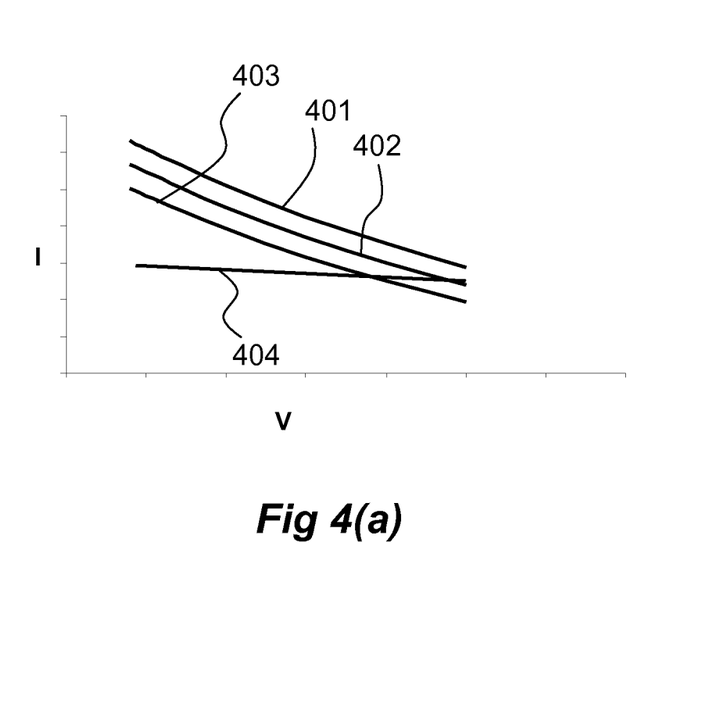

FIG. 4 shows the variation of the battery current with battery voltage for battery chargers having various conversion efficiencies. At FIG. 4(a), the current-voltage variation, over a battery voltage range of 11 to 15 V, is shown at graph 401, 402 and 403 for battery chargers having conversion efficiencies of 95%, 90% and 85%, where the panel has a Vmp of 17 V. Also shown on the figure is the equivalent battery current produced from an equivalent non-MPPT-tracking battery charger. This curve follows part of the IV characteristic of the photovoltaic generator, slightly to the left of the maximum power point shown in FIG. 3, and is thus nearly flat. As is clear from the figure, the closer the voltage of the battery is to the maximum power voltage of the panel, the smaller is the advantage obtained by using the MPPT battery charger.

Figure 4B:
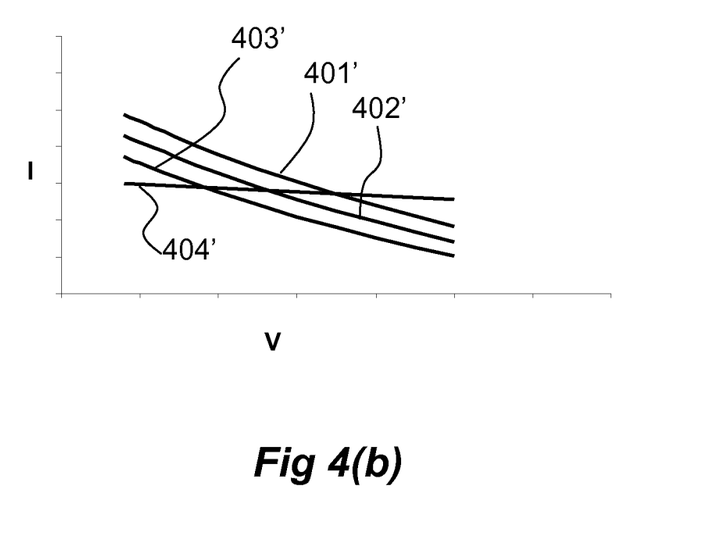

In FIG. 4(b), the battery current variation with battery voltage is plotted for the same charger MPPT efficiencies, for a panel operating at its maximum power point voltage of 15 V. The characteristics for MPPTs with efficiencies of 95%, 90% and 85%, are shown at 401', 402' and 403' respectively. Also shown is the equivalent battery current produced from an equivalent non-MPPT-tracking battery charger. From this figure it is clear that the non-MPPT battery charger produces a higher output current towards the right-hand part of the curves. At Vmp, the current differences correspond to the conversion efficiencies of the tracker. This is easy to understand in terms of power, since when the panel is operating at its maximum power voltage, and produces maximum power, the whole of this power is transferred to the battery for the non-MPPT case, whilst for the MPPT battery charger, the power lost due to the tracker—which corresponds directly to the controller efficiency—is not transferred to the battery.

Figure 5:
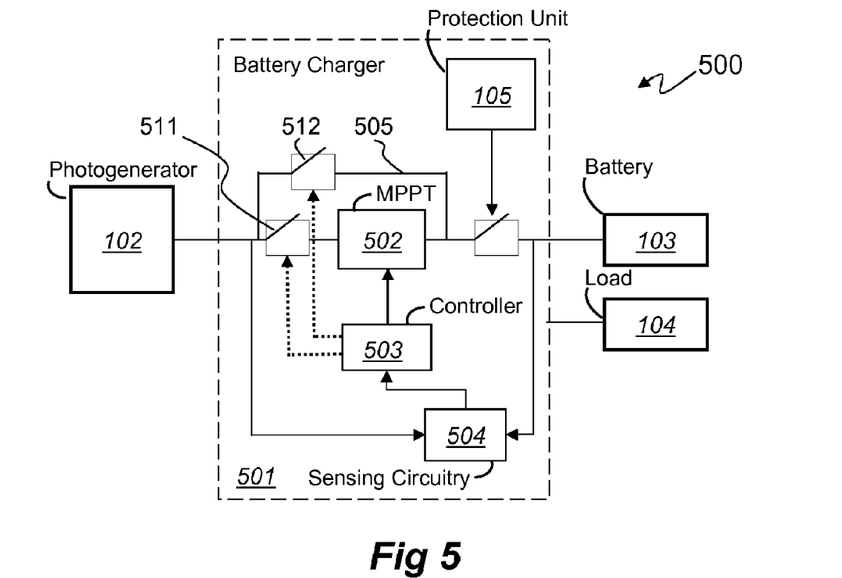
FIG. 5 shows, schematically, a photovoltaic system according to an embodiment of the invention.

An embodiment of the invention is illustrated in FIG. 5. The figure shows a photovoltaic system 500 in which a battery charger 501 is connected between a photogenerator 102 and a battery 103, and optionally a load 104. The battery charger 501 includes maximum power point tracking by means of MPPT 502. The MPPT 502 is under control of a controller 503. Sensing circuitry 504 provides information to the controller 503. However, this charger includes a bypass line or bypass circuit 505. The battery is connected to the photogenerator via either the MPPT circuit 502 or the bypass circuit 505, by means of switches 511 and 512 respectively. The switches 511 and 512 are under control of the controller 503. Operation of this embodiment will be described hereunder with reference to FIG. 7.

Figure 6:
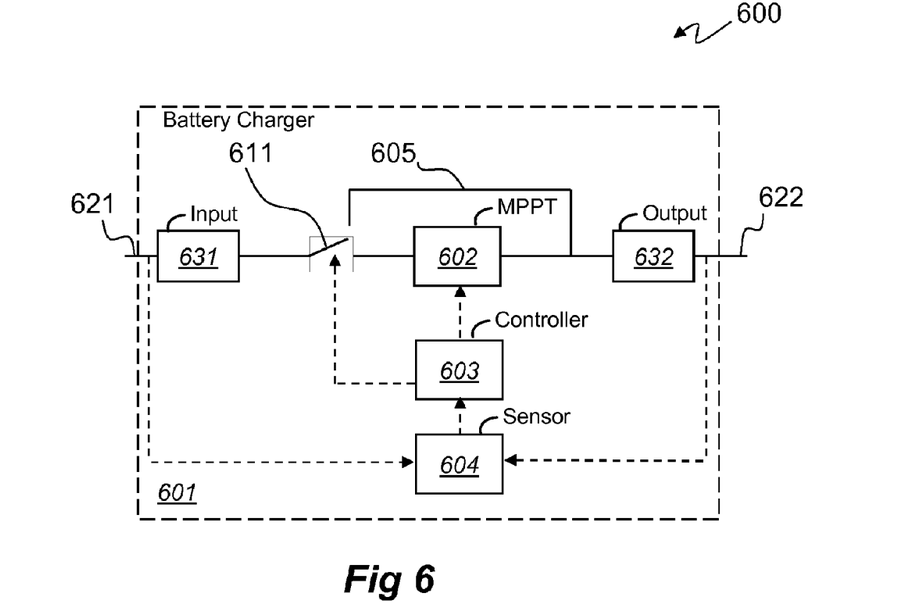
FIG. 6 shows, schematically, a battery charger according to an embodiment of the invention.

An alternative, more generic embodiment of the invention is shown in FIG. 6. The figure shows a battery charger 601, which is generically similar to that shown in FIG. 5. The battery charger 601 includes an input circuit 631 connecting an input 621 to a switch 611. The switch of 611 is operative to connect input circuit 631 to output circuit 632 by means of MPPT 602 or tracker bypass circuit 605. An output is connected to the output side of output circuit 632. MPPT 602 and switch 611 are both under the control of controller 603. Sensors 604 provide information on at least one of either the input 621 or the output 622 to controller 603.

It will be readily appreciated by the skilled person that input circuit 631 and output circuit 632 may take the form of a simple link in the circuit, such as a wire link, a metal track or the like. In other embodiments input circuit 631 may, without limitation, take the form of a protection unit, for instance a short circuit protection unit. Such a short circuit protection unit may be particularly useful in embodiments designed for use with photogenerators which comprise a plurality of series strings. In such photogenerators, it may be important to preclude the possibility of a sustained short circuit across the output (that is to say, the input connectors to the battery charger), since such a short circuit could result in abnormally high current through one or other of the component strings, leading to damage of the photogenerator. Similarly, it will be ready readily appreciated by the skilled person that output circuit 632 may similarly comprise a simple circuit link; alternatively, in other embodiments output circuit 632 may, without limitation, provide an over-protection circuit to protect for instance the battery from being overcharged.

Figure 7:
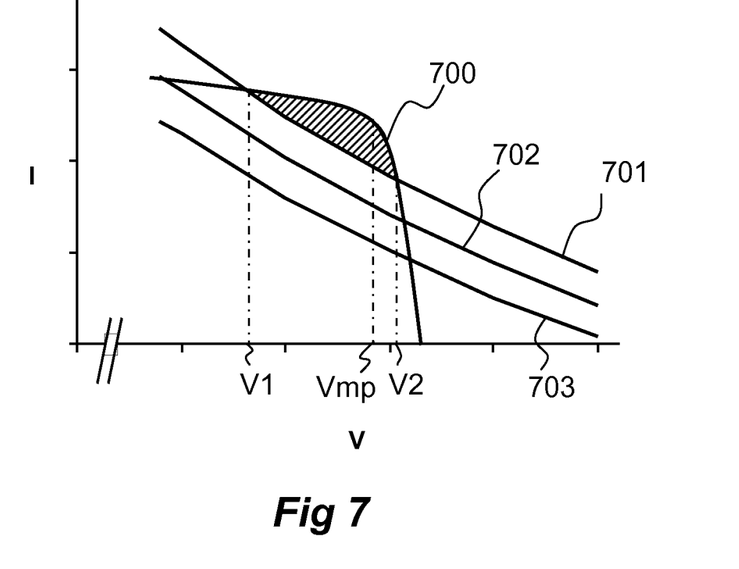
FIG. 7 shows the variation of battery current with battery voltage for a photovoltaic system according to embodiments of the invention; and, FIG. 8 shows the time profile for a typical battery charging cycle.

Operation of the embodiments described above will now be considered, with reference to FIG. 7. In the description that follows, the reference numerals in brackets refer to the embodiment shown in FIG. 6, whereas those outside the brackets refer to the features of the embodiment of FIG. 5. FIG. 7 shows the variation of battery current with battery voltage for a MPPT battery charger operating in MPPT mode at graph 701, and in non-MPPT mode at graph 700. In non-MPPT mode, the controller 503 (603) sets the switches 511, 512 (611) to route the power from the solar module through the bypass circuit 505 (605). As shown in this embodiment the bypass circuit is a simple conductive link such as a wire or a metal track or the like. There is thus negligible power consumed in the bypass circuit. In MPPT mode, in contrast, the power from the solar module is routed through the MPP tracker 502 (602). The MPP tracker 502 (602) is operational to maintain the input impedance such that the solar module operates at its maximum power point thus maximising the output of the module. However, there is introduced a power loss into the system due to the fact that the MPP tracker does not operate with a 100% conversion efficiency. The exemplary MPP tracker illustrated by graph 701 may have a conversion efficiency of, say 95%: the battery current produced by battery chargers having trackers with lower conversion efficiencies, say for instance 90% or 85%, are shown by graphs 702 and 703.

As is clear from FIG. 7, there is a range of battery voltages around Vmp, V1 to V2 as shown, over which the battery current 700 resulting from using the bypass circuit is greater than that using the MPP tracker. This range, it will be readily appreciated from the above discussion, corresponds to the range of voltages over which the power loss attributable to the MPPT circuit is greater than the power loss, which would otherwise be attributable to a mismatch between the maximum power voltage and the operating voltage of the solar module.

A controller according to embodiments of the invention is configured to determine whether the solar module is operating within the range of voltages for which it is energetically beneficial to bypass (and disable) the MPPT. If such determination is made, the controller operates to set the switches 511 and 512 (611) in order to bypass the MPPT. Moreover, the MPPT controller may then be put into a suspend mode, or into a deep power-down mode, in order to further reduce the loss of power. If the controller determines that the operation is not within this range, the controller operates to set the switches 511 and 512 (611) in order to route the power through the MPPT circuit.

Two exemplary algorithms for the operation of the controller will now be described. The condition to enter bypass mode (where the solar module is directly connected to the battery) would be that battery current in bypass mode should be greater than the battery current in MPPT mode (where the PV is connected to the battery through a converter). In the first algorithm: Measure battery current at MPP and in bypass mode by switching the battery charger to those modes and making a decision based on the measured values. This can be done on a periodic basis.

In a second algorithm according to another embodiment, the battery current in bypass mode can be found in MPPT mode without switching to bypass mode by making some approximations: For various modules it is found experimentally that the battery current in bypass mode lies between 86% and 91% of the module short circuit current Isc. Similarly the current at MPP typically lies between 85% and 90% of the PV short circuit current. From the shape of the IV characteristic 700 of typical panels, it is possible to estimate an operating range over which battery current in bypass mode is higher than that achieved through MPPT. Experimentally, it has been determined, for one type of panel, that the bypass mode should be operational whenever the battery current is less than 103% of the photogenerated current at MPP—that is, less that 103% of Imp. This second algorithm is advantageous, since it avoids the need to switch back and forth between tracking and bypass mode which could lead to a system overhead and loss of charging efficiency.

In order to exit the bypass mode, according to one embodiment, the current at MPP is measured in tracking mode as is the directly supplied battery current in bypass mode (which of course is equal to the module current), and the decision whether or not to the switch is made based on the respective battery currents.

Once the system is in bypass mode it would not be possible to estimate battery current in MPP mode as can be done on entering the bypass mode using the efficiency equation (1), since Pmax is not known, and not directly determinable whilst in bypass mode. Thus, it is necessary periodically to forcibly switch into tracking mode to check the current. The period for checking the current in tracking mode can be set dynamically, or may be predetermined, but should be selected carefully by the developer based on, for instance, the temperature, battery voltage and irradiance change. In an exemplary practical embodiment a period of 10 minutes has been found to be appropriate.

Figure 8:
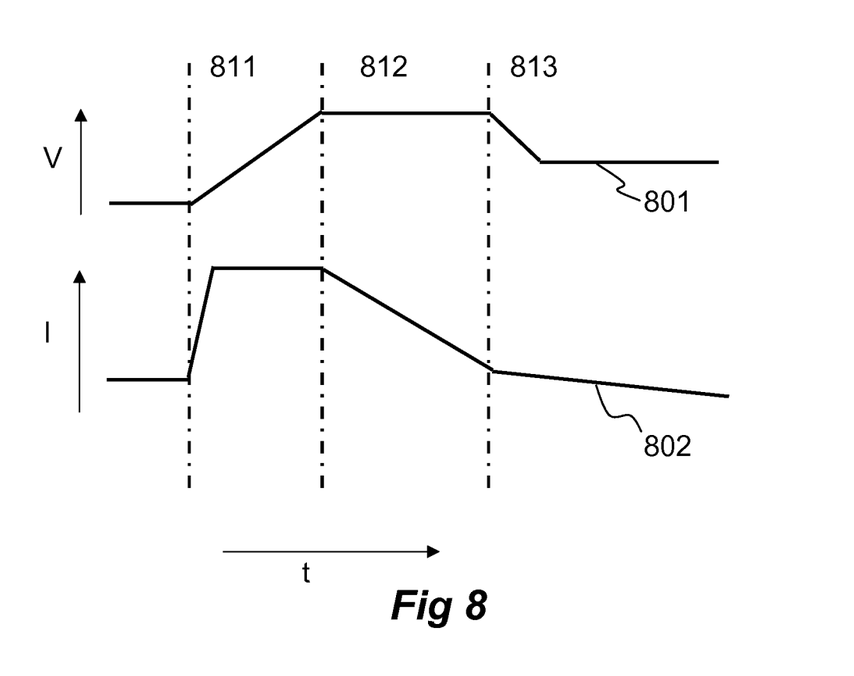

The time profile for a typical battery charging cycle is shown in FIG. 8. The figure shows, on a first graph 801, the variation of the battery voltage (V) over time, and on a second graph 802 the variation of the charging current over time. The diagram shows three distinct stages: the first stage 811 is the bulk stage, during which the charging current 802 initially rapidly rises until it reaches a maximum permissible charging current, which typically is preset by the battery charger. Throughout the remainder of this stage the battery charger operates in a constant current mode at this current level; the battery voltage slowly rises. Once the battery reaches its nominal battery voltage, the first bulk stage terminates, and the charging cycle moves to a second absorption stage 812. During this stage, the battery voltage remains at its nominal voltage level, and the charging current gradually falls back to zero. At the end of this stage, the battery may be considered to be fully charged. Typically the battery now enters the final "float" stage 813. Whilst in the float stage, the battery voltage falls back a little bit and then remains constant; at the same time, a small trickle current flows to the battery to maintain the float voltage.

It will be appreciated by the skilled person that, while a battery charger according to embodiments of the invention is in bypass mode, there is no control parameter which may be used in order to ensure constant current mode, as is required in the bulk charging stage 811. However, a battery may be modelled by a high resistance first impedance in series with a parallel combination of a second resistor and capacitor (the values of each being dependent on the state of charger the battery), and by appropriate choice of the battery and photogenerator, direct charging in the bypass mode may be an adequate approximation to the desired constant current charging (since the solar module is operating along the nearly flat part of the of it IV characteristic to the left of MPP). However, this is not the case during the absorption stage 812. Embodiments of the invention thus are the more suited for operation during the bulk stage of charging 811 than during the absorption stage. However, the skilled person will readily appreciate that by careful control, and in particular by appropriately switching between bypass mode and tracker mode, an adequate approximation of the battery input impedance required for the absorption stage 812 of charging may be obtained.

In summary, then, from one perspective, disclosed herein is a battery charger, or charge controller, for a photovoltaic system, comprising a maximum power point tracker (MPPT) circuit, which may be bypassed by means of a bypass circuit. The bypass circuit may be a simple electrical wire or link. The battery charger is operable to track the maximum power of a photogenerator by means of the MPPT, or to bypass the MPPT and disable it, in dependence on whether the power loss which results from the MPPT would be greater than the power saving achieved by tracking the maximum power point of the photogenerator. Also disclosed herein are a control unit for use in such a battery charger, and a method for controlling such a battery charger From reading the present disclosure, other variations and modifications will be apparent to the skilled person. Such variations and modifications may involve equivalent and other features which are already known in the art of battery chargers and charge controllers, and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub-combination.

The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

The invention claimed is:

1. A battery charger for a photovoltaic system, comprising
an input circuit having an input configured and arranged to couple to the photovoltaic system,
an output circuit having an output configured and arranged to couple to a battery,
a tracker circuit and a tracker bypass circuit each configured and arranged to couple between the input circuit and the output circuit, and each configured and arranged to provide a charging voltage and a charging current to the output circuit when connected thereto,
a sensing circuit configured and arranged to
sense a first value of a parameter indicating at least one of the charging voltage at the output and the charging current at the output when the tracker circuit is connected between the input circuit and the output circuit, and
sense a second value of the parameter indicating at least one of the charging voltage at the output and the charging current at the output when the tracker bypass circuit is connected between the input circuit and the output circuit,
and a controller circuit configured and arranged to connect a one of the tracker bypass circuit or the tracker circuit between the input circuit and the output circuit in dependence on a comparison between at least one of: the charging voltage of the first value and the second value, and the charging current of the first value and the second value.

2. A battery charger as claimed in claim 1, wherein the tracker circuit comprises a DC-DC converter configured to track, in use, a maximum power point of the photovoltaic system.

3. A battery charger as claimed in claim 2, wherein the controller circuit is operable to connect the tracker bypass circuit in response to the charging current being less than a predetermined multiple of a PV current at the input and at the maximum power point.

4. A battery charger as claimed in claim 3, wherein the predetermined multiple is between 100% and 105%.

5. A battery charger as claimed in claim 3, wherein the predetermined multiple is 103%.

6. A battery charger as claimed in claim 1, wherein at least one of the input circuit and the output circuit comprises a protection circuit for protection against at least one of overload and short-circuit and over-charging.

7. A battery charger according to claim 1, the controller circuit being further configured and arranged to control the tracker circuit for providing the charging voltage and the charging current.

8. The battery charger of claim 1,
further including at least one switch configured and arranged to connect the one of the tracker bypass circuit or the tracker circuit between the input circuit and the output circuit, and
wherein the controller circuit is connected to the at least one switch and configured and arranged to operate the at least one switch to connect the one of the tracker bypass circuit and the tracker circuit between the input circuit and the output circuit in response to the comparison.

9. A method of controlling a photovoltaic battery charger having a tracker mode in which an input current is converted to an output current, and a tracker bypass mode, the method comprising, in a controller circuit:

determining a first value of a parameter indicative of at least one of a charging voltage at an output of the battery charger and a charging current at the output, when the charger is in tracker mode,
determining a second value of a second parameter indicative of at least one of the charging voltage at the output and the charging current at the output when the charger is in bypass mode, and
selecting a one of the tracker mode and the bypass mode in dependence on a comparison of the first value to the second value.

10. The method of claim 9, further including, using the controller circuit, controlling at least one switch to connect the battery charger to a tracker circuit that converts the input current to the output current in the tracker mode, and to connect the battery charger to a tracker bypass circuit in the bypass mode in which the tracker circuit is bypassed.

11. A method of operating a controller circuit for a photovoltaic battery charger having a tracker mode in which an input current received from a photovoltaic panel is converted to an output current that is provided to a battery, and a tracker bypass mode, the method comprising:
selecting the tracker mode,
while operating in the tracker mode, sensing a first value of a parameter indicating one of a voltage provided to the battery and the output current provided to the battery,
while operating in the tracker bypass mode, sensing a second value of the parameter indicating one of the voltage provided to the battery and the output current provided to the battery,
selecting a one of the tracker mode and the tracker bypass mode in dependence on a comparison of one of voltage and current indicated by the first and second values.

12. The method of claim 11, wherein the parameter is the output current.

13. The method of claim 12, wherein the tracker bypass mode is selected if the output current is less than a predetermined multiple of the input current.

14. The method of claim 13, wherein the predetermined multiple is between 100% and 105%.

15. The method of claim 13, wherein the predetermined multiple is 103%.

16. The method of claim 11, wherein, when the charger is in tracker mode, the controller circuit adjusts the input current such that an input power is within a predetermined range of a maximum power point.

17. The method of claim 16, wherein the controller adjusts the input current such that the input power provided by the input current is within 2% of a maximum power point.

18. The method of any of claim 11, wherein selecting a one of the tracker mode and the tracker bypass mode comprises connecting the respective one between an input of the photovoltaic battery charger and an output of the photovoltaic battery charger.

19. A computer program stored on a non-transitory computer readable medium, which when run on a computer, causes the computer to:
select a tracker mode in which an input current received from a photovoltaic panel is converted to an output current that is provided to a battery;
while operating in the tracker mode, sense a first value of a parameter indicating one of a voltage provided to the battery and the output current provided to the battery;
while operating in a tracker bypass mode, sense a second value of the parameter indicating one of the voltage provided to the battery and the output current provided to the battery;

select a one of the tracker mode and the tracker bypass mode in dependence on a comparison of one of voltage and current indicated by the first and second values.

20. The computer program of claim 19 which, when run on the computer, causes the computer to select the one of the tracker mode and the tracker bypass mode by controlling at least one switch to in the tracker mode, connect the photovoltaic panel to the battery via a tracker circuit that converts the input current to the output current, and in the tracker bypass mode, connect the photovoltaic panel to the battery charger via a tracker bypass circuit that bypasses the tracker circuit.

* * * * *